US012807812B2

(12) United States Patent
Gronwald et al.

(10) Patent No.: US 12,807,812 B2
(45) Date of Patent: Nov. 24, 2026

(54) SOLUTION OF POLYSULFONE POLYMERS IN GAMMA-VALEROLACTONE FOR THE USE IN MEMBRANES

(71) Applicant: BASF SE, Ludwigshafen am Rhein (DE)

(72) Inventors: Oliver Gronwald, Ludwigshafen (DE); Daniela Klein, Ludwigshafen (DE); Martin Weber, Ludwigshafen (DE); Regina-Margareta Berg, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 850 days.

(21) Appl. No.: 17/907,550

(22) PCT Filed: Jun. 8, 2021

(86) PCT No.: PCT/EP2021/065241

§ 371 (c)(1),
(2) Date: Sep. 28, 2022

(87) PCT Pub. No.: WO2021/254820

PCT Pub. Date: Dec. 23, 2021

(65) Prior Publication Data

US 2023/0146760 A1 May 11, 2023

(30) Foreign Application Priority Data

Jun. 18, 2020 (EP) .................................... 20180823

(51) Int. Cl.

| | |
|---|---|
| ***C08L 81/06*** | (2006.01) |
| ***B01D 61/14*** | (2006.01) |
| ***B01D 61/24*** | (2006.01) |
| ***B01D 67/00*** | (2006.01) |
| ***B01D 71/68*** | (2006.01) |
| ***C08K 5/1535*** | (2006.01) |
| ***C08L 39/06*** | (2006.01) |
| ***C08L 71/02*** | (2006.01) |

(52) U.S. Cl.

CPC ............ *C08L 81/06* (2013.01); *B01D 61/145* (2013.01); *B01D 61/243* (2013.01); *B01D 67/0006* (2013.01); *B01D 67/0009* (2013.01); *B01D 67/0011* (2013.01); *B01D 71/68* (2013.01); *C08K 5/1535* (2013.01); *C08L 39/06* (2013.01); *C08L 71/02* (2013.01); *B01D 2325/02834* (2022.08)

(58) Field of Classification Search

None

See application file for complete search history.

(56) References Cited

U.S. PATENT DOCUMENTS

| | | | | |
|---|---|---|---|---|
| 4,207,182 | A | 6/1980 | Marze | |
| 5,259,950 | A * | 11/1993 | Shiro | B01D 71/66 210/500.28 |
| 5,885,456 | A | 3/1999 | Charkoudian et al. | |
| 2010/0224553 | A1 | 9/2010 | Ansorge et al. | |
| 2015/0352502 | A1 | 12/2015 | Moore et al. | |
| 2017/0236647 | A1* | 8/2017 | Intelmann | H01G 9/0036 427/80 |
| 2019/0177539 | A1* | 6/2019 | Di Nicolo' | C08G 18/6674 |

FOREIGN PATENT DOCUMENTS

| | | | | |
|---|---|---|---|---|
| EP | 2845641 | A1 | 3/2015 | |
| EP | 3363865 | A1 | 8/2018 | |
| WO | WO-9116943 | A1 * | 11/1991 | A61N 1/0444 |
| WO | 9955449 | A1 | 11/1999 | |
| WO | 2016023765 | A1 | 2/2016 | |
| WO | 2017157933 | A1 | 9/2017 | |
| WO | 2017220386 | A1 | 12/2017 | |

OTHER PUBLICATIONS

Dong, et al., "Chapter 24: Investigation of PolarClean and Gamma-Valerolactone as Solvents for Polysulfone Membrane Fabrication", Green Polymer Chemistry: New Products, Processes, and Applications, ed. Cheng, et al., Nov. 26, 2018, pp. 385-403.

European Search Report for EP Patent Application No. 20180823.5, Issued on Sep. 11, 2020, 5 pages.

Rasool, et al., "Use of γ-valerolactone and glycerol derivatives as bio-based renewable solvents for membrane preparation", Green Chemistry, vol. 21, Issue 5, Feb. 2, 2019, pp. 1054-1064.

Unpublished European Search Report for EP Patent Application No. 15185604.4, filed on Sep. 17, 2015, titled "Process for Making Membranes", 33 pages.

Wei, et al., "Mathematical calculation of binodal curves of a polymer/solvent/nonsolvent system in the phase inversion process", Desalination, vol. 192, Issues 1-3, May 10, 2006, pp. 91-104.

International Search Report and Written Opinion for PCT/EP2021/065241 issued on Jul. 7, 2021, 9 pages.

Dong et al., "Comparison of two low-hazard organic solvents as individual and cosolvents for the fabrication of polysulfone membranes", AlChE Journal, vol. 66:e16790 (2020).

* cited by examiner

*Primary Examiner* — Robert S Jones, Jr.
*Assistant Examiner* — Lily K Sloan
(74) *Attorney, Agent, or Firm* — Armstrong Teasdale LLP

(57) ABSTRACT

Described herein is a solution including at least one sulfone polymer, at least one water-soluble polymer, and gamma-valerolactone. Also described herein is a process of making a membrane using the solution, and a method of using the membrane for water ultrafiltration and/or dialysis.

17 Claims, 4 Drawing Sheets

SOLUTION OF POLYSULFONE POLYMERS IN GAMMA-VALEROLACTONE FOR THE USE IN MEMBRANES

CROSS-REFERENCE TO RELATED APPLICATIONS

This application is a U.S. National Phase Application of PCT/EP2021/065241, filed Jun. 8, 2021, which claims the benefit of priority to European Patent Application No. 20180823.5, filed Jun. 18, 2020, the entire contents of which are hereby incorporated by reference herein.

The present invention relates to a solution comprising at least one sulfone polymer, at least one water-soluble polymer and gamma-valerolactone (4,5-Dihydro-5-methyl-2 (3H)-furanone, CAS number 108-29-2, formula I), the process of making a membrane and the use of this membrane for water ultrafiltration and/or dialysis.

(I)

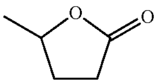

gamma-valerolactone

Sulfone polymers such as polysulfone, poly(ether sulfone) and poly(phenyl sulfone) are high performance polymers which are used in a variety of technical applications because of their mechanical properties and their chemical and thermal stability. Sulfone polymers, however, have limited solubility in many common solvents.

U.S. Pat. No. 5,885,456 discloses N-methyl-2-pyrrolidone (NMP), N,N-dimethylacetamide (DMAC), dime-thylacrylamide (DMAD) or dimethylsulfoxide (DMSO) as suitable solvent for sulfone polymers. However, NMP, DMAC, DMAD and DMSO have toxicological disadvantages.

One major technical application is the use of sulfone polymers as raw materials for the production of membranes, for example ultrafiltration membranes (UF membranes), as described in U.S. Pat. Nos. 4,207,182 and 5,885,456. The process of producing membranes from sulfone polymers includes dissolving sulfone polymers in a solvent, coagulating the sulfone polymer from such solvent and further post-treatment steps. The selection of the solvent is essential to the process and has impact on the properties of the obtained membrane, including but not limited to the membranes' mechanical stability, water permeance and size of pores.

M. A. Rasool and I. F. J. Vankelecom, Green Chemistry, 21, pp. 1054-1064 (2019) describes the use of gamma-valerolactone as biobased renewable solvent without the addition of a water-soluble polymer during the production process. However, the prepared poly(ether sulfon) (PESU) and polysulfon (PSU) membranes show an insufficient permeance.

In the field of solvents there is an ongoing demand for alternative solvents which may replace presently used solvents in specific applications. Regarding membranes made there from it is important that at least the same standard of membrane quality and possibly an even better membrane quality is achieved. In particular, the water permeability of such membranes should be as high as possible combined with a molecular weight cutoff in the ultrafiltration range of 10 to 100 kDa. Furthermore, there is the requirement to provide solvents for membranes with an improved toxicological profile.

It was an object of the present invention to provide an alternative solvent for sulfone polymers and for the process of making membranes. The alternative solvent should fulfill the requirements listed above.

The object is achieved by the solution as defined below and a process for the making of membranes as defined below.

The solution according to the present invention comprises a) at least one sulfone polymer, b) at least one water-soluble polymer, c) and gamma-valerolactone and d) optionally further additives.

To the Sulfone Polymer

The solution according to the present invention comprises a sulfone polymer. The term "sulfone polymer" shall include a mixture of different sulfone polymers.

A sulfone polymer comprises $—SO_2—$ units in the polymer, preferably in the main chain of the polymer.

Preferably, the sulfone polymer comprises at least 0.02 mol $—SO_2—$ units, in particular at least 0.05 mol $—SO_2—$ units per 100 grams (g) of the sulfone polymer. More preferred is a sulfone polymer comprising at least 0.1 mol $—SO_2—$ units per 100 g of the sulfone polymer. Most preferred is a sulfone polymer comprising at least 0.15 $SO_2—$ units, in particular at least 0.2 mol $—SO_2—$ units per 100 g of the sulfone polymer.

Usually a sulfone polymer does comprise at maximum 2 mols$—SO_2—$ units, in particular at maximum 1.5 mols of $—SO_2—$ units per 100 grams (g) of the sulfone polymer. More preferred is a sulfone polymer comprising at maximum 1 mol of $—SO_2—$ units per 100 grams of the sulfone polymer. Most preferred is a sulfone polymer comprising at maximum 0.5 of $—SO_2—$ units per 100 grams of the sulfone polymer.

Preferably, the sulfone polymer comprises aromatic groups, shortly referred to as an aromatic sulfone polymer.

In an embodiment, the sulfone polymer is an aromatic sulfone polymer, which consists to at least 20 wt.-% (weight-%), in particular to at least 30 wt.-% of aromatic carbon atoms, based on the total weight of the sulfone polymer. An aromatic carbon atom is a carbon atom, which is part of an aromatic ring system.

More preferred is an aromatic sulfone polymer, which consists to at least 40 wt.-%, in particular to at least 45 wt.-% of aromatic carbon atoms, based on the total weight of the sulfone polymer.

Most preferred is an aromatic sulfone polymer, which consists to at least 50 wt.-%, in particular to at least 55 wt.-% of aromatic carbon atoms, based on the total weight of the sulfone polymer.

In an embodiment, the sulfone polymer is an aromatic sulfone polymer, which consists to at most 80 wt.-%, in particular to at most 72 wt.-% of aromatic carbon atoms, based on the total weight of the sulfone polymer.

Preferably, the sulfone polymer may comprise aromatic groups that are selected from 1,4-phenylene, 1,3-phenylene, 1,2-phenylene, 4,4'-biphenylene, 1,4-naphthylene, 3-chloro-1,4-phenylene or mixtures thereof.

The aromatic groups may be linked from, for example, units selected from $—SO_2—$, $—SO—$, $—S—$, $—O—$, $—CH_2—$, $—C(CH_3)_2$ or mixtures thereof.

In an embodiment, the sulfone polymer consists to at least 80 wt.-%, more preferably to at least about 90 wt.-% and most preferably to at least 95 wt.-%, respectively at least 98 wt.-%, of groups selected from the above aromatic groups and/or linking groups, based on the total weight of the sulfone polymer.

Examples of Preferred Sulfone Polymers are:

Poly(Ether Sulfone) of Formula II

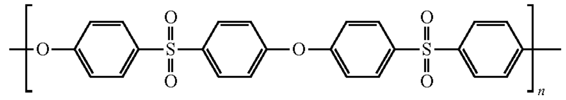

which is, for example, available from BASF under the trade name Ultrason® E, polysulfone of formula III

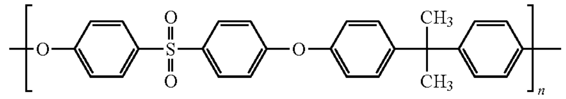

which is, for example, available from BASF under the trade name Ultrason® S and poly(phenyl sulfone) of formula IV

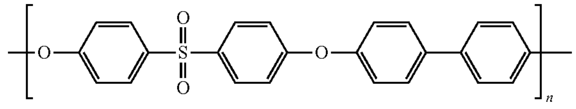

which is, for example, available from BASF under the trade name Ultrason® P.

The most preferred sulfone polymer is poly(ether sulfone), e.g. (Ultrason® E).

The viscosity number (V.N.) for the sulfone polymers may range from 50 to 120 ml/g, preferably from 60 to 100 ml/g. V.N. is measured according to ISO 307 in 0.01 g/mol phenol/1,2 orthodichlorobenzene 1:1 solution.

For the sulfone polymers weight average molecular weights Mw of 45 to 95 kDa, preferably 50 to 60 kDa may be used. For the sulfone polymers Ultrason® E having weight average molecular weights Mw of 48 to 92 kDa, Ultrason® S having weight average molecular weights Mw 52 to 60 kDa and Ultrason® P having weight average molecular weights Mw 48 kDa are available. Mw is measured according to gel permeation chromatography. Said Ultrason polymers are commercially available from BASF SE, cf. brochure: Ultrason—a versatile material for the production of tailor-made membranes, BASF SE, 2017, page 6 (https://plastics-rub-ber.basf.com/global/de/performance_polymers/downloads.html).

The solution may further comprise the polymers poly (vinylidene fluoride) (PVDF) and/or ethylene chlorotrifluoroethylene (ECTFE). Preferably PVDF and ECTFE grades in powder and pellet form are used. These PVDF grades may be used as linear or gel-free products with weight average molecular weights Mw in the range from 300-320 kDa (e.g. Solef® 6010), 380-400 kDa (e.g. Solef® 6012), 570-600 kDa (e.g. Solef® 1015) and 670-700 kDa (e.g. Solef® 6020) available e.g. from Solvay Specialty Polymers. ECTFE may be used with a melt flow index of 1.0 (tested at 2.16 kg and 5.0 kg available e.g. from Halar® 901 and 902 from Solvay Specialty Polymers).

To the Water-Soluble Polymers

The main purpose of the water solution polymer is to support the formation of the pores. In the coagulation step during the process of making the membrane the water-soluble polymer becomes distributed in the coagulated membrane and thus becomes the place holder for pores. The water-soluble polymer also helps to adjust the viscosity of the solution.

Preferred water-soluble polymers are selected from the group of poly(N-vinyl pyrrolidone) (PVP), poly(ethylene oxide), poly(propylene oxide), poly(ethylene oxide) (PEO)/poly(propylene oxide) block copolymers or mixtures thereof with a molar mass of 8000 g/mol or higher. Especially preferred as water-soluble polymer are poly(ethylene oxide), poly(N-vinyl pyrrolidone) with a molar mass of 8000 g/mol or higher or mixtures thereof. Most preferred is poly(ethylene oxide) with a molar mass of 8000 g/mol or higher.

A most preferred water-soluble polymer is poly(N-vinyl pyrrolidone) with a solution viscosity characterised by the K-value of 30 or higher determined according to the method of Fikentscher (Fikentscher, Cellulosechemie 13, 1932 (58)) and/or poly(ethylene oxide) with a molar mass of 50000 to 2000000 g/mol determined according to gel permeation chromatography (GPC in water, poly(ethylene oxide) standard) or higher. Most preferred is poly(ethylene oxide) with a molar mass of 100000 to 500000 determined according to gel permeation chromatography (GPC in water, poly(ethylene oxide) standard) or higher.

To the Solution

The solution may comprise further additives. These additives are selected from the group of $C_2$-$C_4$ alkanol, $C_2$-$C_4$ alkanediol, $C_3$-$C_4$ alkanetriol, polyethylene glycol with a molar mass in the range of 100 to 1000 g/mol or mixtures of those. Preferred additives are ethanol, n-propanol, iso-propanol, n-butanol, iso-butanol, tert-butanol, ethylene glycol, 1,1-ethandiol, 1,2-propandiol, 1,3-propandiol, 2,2-propandiol, 1,2,3-propantriol, 1,1,1-propantriol, 1,1,2-propantriol, 1,2,2-propantriol, 1,1,3-propantriol, 1,1,1-butantriol, 1,1,2-butantriol, 1,1,3-butantriol, 1,1,4-butantriol, 1,2,2,-butantriol, 2,2,3-butantriol, 2-methyl-1,1,1-triolpropan, 2-methyl-1,1,2-triolpropan, 2methyl-1,2,3-triolpropan, and/or 2-methyl-1,1,3-triol-propan or mixtures thereof.

In an embodiment up to 25 wt.-%, in particular up to 15 wt. %, based on the total weight of the solution is an additive. In one embodiment the amount of additive is in the range of 0.1 to 25 wt. %, in particular 5 to 15 wt.-%, preferably 7.5 to 12.5 wt.-%, based on the total weight of the solution.

The solution may comprise further solvents besides the gamma-valerolactone, hereinafter referred to as co-solvent (s).

In an embodiment the solution according to the present invention comprises less than 25 wt.-%, preferably less than 10 wt.-%, more preferably less than 5 wt.-%, more preferably less than 2.5 wt.-%, most preferably less than 1 wt.-%, most preferably 0 wt.-% cosolvent(s) based on the total amount of the solution.

In an embodiment the solution according to the present invention comprises less than 25 wt.-%, preferably less than 10 wt.-%, more preferably less than 5 wt.-%, more preferably less than 2.5 wt.-%, most preferably less than 1 wt.-%, most preferably 0 wt.-% cosolvent(s) based on the total amount of gamma-valerolactone in the solution.

Preferred are co-solvents are miscible with the gamma-valerolactone in any ratio. Suitable co-solvents are, for example, selected from high-boiling ethers having a boiling point of more than 150 °C, esters, ketones, asymmetrically halogenated hydrocarbons, anisole, dimethylformamide, dimethyl sulfoxide, sulfolane, N-methyl-2-pyrrolidone, N-ethyl-2-pyrrolidone, N,N-dimethyl-2-hydroxypropanoic amide, N,N-diethyl-2-hydroxypropanoic amide or mixtures thereof.

In an embodiment the solution according to the present invention comprises less than 25 wt.-%, preferably less than 10 wt.-%, more preferably less than 5 wt.-%, most preferably less than 1 wt.-% cosolvent or no cosolvent based on the total amount of the solution, wherein the cosolvent is selected from the group consisting of high-boiling ethers having a boiling point of more than 150 °C, esters, ketones, asymmetrically halogenated hydrocarbons, anisole, dimethylformamide, dimethyl sulfoxide, sulfolane, N-me-thyl-2-pyrrolidone, N-ethyl-2-pyrrolidone, N,N-dimethyl-2-hydroxypropanoic amide, N,N-diethyl-2-hydroxypropanoic amide and mixtures thereof.

In an embodiment the solution according to the present invention comprises less than 25 wt.-%, preferably less than 10 wt.-%, more preferably less than 5 wt.-%, more preferably less than 2.5 wt.-%, most preferably less than 1 wt.-%, most preferably 0 wt.-% dimethyl sulfoxide based on the total amount of the solution.

In a preferred embodiment no co-solvent is used in the solution and gamma-valerolactone is the only solvent used.

Preferably, the solution comprises 1 to 50 wt.-%, in particular 5 to 40 wt.-%, in particular 10 to 30 wt.-%, more preferably 15 to 20 wt.-% of sulfone polymer based on the total weight of the solution.

Preferably, the solution comprises 0.1 to 15 wt.-%, in particular 1 to 10 wt.-%, more preferably 3 to 8 wt.-% water-soluble polymers based on the total weight of the solution.

Preferably, the solution comprises 50.-wt.-% to 90 wt.-%, in particular 60 to 80 wt.-% gamma-valerolactone based on the total weight of the solution.

As a general rule the total amount of all components of the solution does not exceeds 100%.

The solution may be prepared by adding the sulfone polymer and the water-soluble polymer to the gamma-valerolactone and dissolving the sulfone polymer according to any process known in the art. The dissolution process may be supported by increasing the temperature of the solution to 20 to 100 °C, preferably 40 to 80 °C, more preferably 50 to 60, and/or by mechanical operations like stirring. In an alternative embodiment the sulfone polymer may be already synthesized in gamma-valerolactone or a solvent mixture comprising gamma-valerolactone.

In one embodiment the solution according to the present invention comprises a) 5 to 50 wt.-%, in particular 10 to 40 wt.-%, more preferably 15 to 25 wt.-% of sulfone polymer sulfone polymer(s), and/or b) 0.1 to 15 wt.-%, in particular 1 to 10 wt.-%, more preferably 3 to 8 wt.-% water-soluble polymer(s) and/or c) 50.-wt.-% to 90 wt.-%, in particular 60 to 80 wt.-% gamma-valerolactone and/or d) optionally 0.1 wt.-% to 25 wt.-%, preferably 1 wt.-% to 10 wt.-% further additives based on the total weight of the solution, wherein the total amount of all components of the solution does not exceeds 100%.

To the Process of Making a Membrane

In the context of this application a membrane shall be understood to be a semipermeable structure capable of separating two fluids or separating molecular and/or ionic components and/or particles from a liquid and/or gas from a liquid. A membrane acts as a selective barrier, allowing some particles, substances or chemicals to pass through, while retaining others. The membrane may have various geometries such as flat sheet, spiral wound, pillows, tubular, single bore hollow fiber or multiple bore hollow fiber.

For example, membranes can be reverse osmosis (RO) membranes, forward osmosis (FO) membranes, nanofiltration (NF) membranes, ultrafiltration (UF) membranes or microfiltration (MF) membranes. These membrane types are generally known in the art and are in detail described in literature. A good overview is found also in earlier European patent application No. 15185604.4 (PF 78652) which is here with incorporated herein by reference. A preferred membrane is the ultrafiltration (UF) membrane. Preferred membranes according to the present invention are ultrafiltration (UF) membranes and nanofiltration (NF) membranes, in particular dialysis membranes.

Membranes may be produced according to a process of the present invention comprising the following steps:

a) providing a solution comprising at least sulfone polymer, gamma-valerolactone and further comprising a water-soluble polymer, b) contacting the solution with at least one coagulant, and c) oxidizing and/or washing the obtained membrane.

The solution in step a) corresponds to the solution described above. The main purpose of the water solution polymer is to support the formation of the pores. In the following coagulation step b) the water-soluble polymer becomes distributed in the coagulated membrane and thus becomes the place holder for pores. The water-soluble polymer also helps to adjust the viscosity of the solution.

The solution used in the process according to the present invention may comprise:

i) 5 to 50 wt.-%, in particular 10 to 40 wt.-%, more preferably 15 to 25 wt.-% of sulfone polymer sulfone polymer(s), and/or ii) 0.1 to 15 wt.-%, in particular 1 to 10 wt.-%, more preferably 3 to 8 wt.-% water-soluble polymer(s) and/or iii) 50.-wt.-% to 90 wt.-%, in particular 60 to 80 wt.-% gamma-valerolactone and/or iv) optionally 0.1 wt.-% to 25 wt.-%, preferably 1 wt.-% to 10 wt.-% further additives based on the total weight of the solution, wherein the total amount of all components of the solution does not exceeds 100%, wherein preferably the sulfone polymer is a poly(ether sulfone) polymer and/or wherein preferably the water-soluble polymer is poly (ethylene oxide) with a molar mass of 100000 to 500000.

The solution may optionally be degassed before proceeding to the next step.

In step b) in the process of the present invention the solution is contacted with a coagulant. In this step coagulation of the sulfone polymer occurs and the membrane structure is formed.

The sulfone polymer should have low solubility in the coagulant. Suitable coagulants are, for example, liquid water, water vapor, alcohols, solvents or mixtures thereof. Suitable alcohols are, for example, mono-, di- or trialkanols selected from the group of $C_2$-$C_4$ alkanol, $C_2$-$C_4$ alkanediol, $C_3$-$C_4$ alkanetriol, poly(ethylene oxide) with a molar mass of 100 to 1000 g/mol or mixtures thereof which may be used as coagulants for the inventive solution. Suitable solvent(s) are selected from the group consisting of high-boiling ethers having a boiling point of more than 150 °C, esters, ketones, asymmetrically halogenated hydrocarbons, anisole, dimethylformamide, dimethyl sulfoxide, sulfolane, N-methyl-2-pyrrolidone, N-ethyl-2-pyrrolidone, N,N-dimethyl-2-hydroxypropanoic amide, N,N-diethyl-2-hydroxypropanoic amide and mixtures thereof.

Preferred coagulants are mixtures comprising liquid water and alcohols, e.g. poly(ethylene oxide) with a molar mass of 100 to 1000 g/mol and/or mixtures comprising liquid water and solvents, in particular gamma-valerolactone.

Said coagulants may comprise from 10 to 90-wt.-% water and 90 to 10.-wt.-% alcohol and/or solvent(s), preferably 30 to 70.-wt.-% water and 70 to 30.-wt.-% alcohol and/or solvent(s), based on the total weight of the coagulant. As a general rule the total amount of all components of the coagulant does not exceeds 100%.

More preferred are coagulants comprising liquid water/alcohols mixtures, in particular mixtures of water and poly(ethylene oxide) with a molar mass of 100 to 1000 g/mol or gamma-valerolactone/water mixtures, wherein the coagulant comprises 30 to 70.-wt.-% water and 70 to 30.-wt.-% alcohol and/or solvent(s) based on the total weight of the coagulant.

Most preferred is liquid water as coagulant.

Further details of process steps a) and b) of the present invention depend on the desired geometrical structure of the membrane and the scale of production, which includes lab scale or commercial scale.

For a flat sheet membrane detailed process steps could be as follows:

a1) adding the water-soluble polymer(s) to the solution comprising a sulfone polymer(s) and gamma-valerolactone a2) heating the solution until a viscous solution is obtained; typically the solution is kept at a temperature of 20 to 100 °C, preferably 40 to 80 °C, more preferably 50 to 60 °C, a3) further stirring of the solution until a homogenous mixture is formed; typically homogenization is finalized within 5 to 10 h, preferably within 1 to 2 hours, b) Casting the solution obtained in a3) on a support and thereafter transferring the casted film into a coagulation bath, which is preferably water, and c) oxidizing and/or washing the membrane obtained in step b).

For the membrane 15 to 25 wt.-% of sulfone polymer, preferably a poly(ether sulfone) polymer, 3 to 8 wt.-% water-soluble polymer(s), preferably poly(ethylene oxide) with a molar mass of 100000 to 500000, and 60 to 80 wt.-% gamma-valerolactone based on the total weight of the solution may be used, wherein the total amount of all components of the solution does not exceeds 100%.

For the production of single bore hollow fiber or multiple bore hollow fibers the process steps could be as follows:

a1) adding the water-soluble polymer to the solution comprising sulfone polymer(s) and gamma-valerolactone, a2) heating the solution until a viscous solution is obtained; typically the solution is kept at a temperature of 20 to 100 °C, preferably 40 to 80 °C, more preferably 50 to 60 °C, a3) further stirring of the solution until a homogenous mixture is formed; typically homogenization is finalized within 5 to 10 h, preferably within 1 to 2 hours, b) extruding the solution obtained in a3) through an extrusion nozzle with the required number of hollow needles and injecting the coagulating liquid through the hollow needles into the extruded polymer during extrusion, so that parallel continuous channels extending in extrusion direction are formed in the extruded polymer and c) oxidizing and/or washing the membrane obtained in step b).

Preferably the pore size on an outer surface of the extruded membrane is controlled by bringing the outer surface after leaving the extrusion nozzle in contact with a strong coagulation agent such as water that the shape is fixed without active layer on the inner surface and subsequently the membrane is brought into contact with a mild coagulation agent such as water-alcohol and/or water—solvent mixtures preferably as defined above, preferably gamma-valerolactone/water mixtures preferably as defined above.

In an embodiment process in step c) is any of the above prepared membrane is washed. Preferably the membrane is washed with water.

In one embodiment any of the above prepared membrane is oxidized and washed in step c). For oxidation any oxidant may be used. Preferred is a water-soluble oxidant, preferably aqueous hypochlorite solutions (e.g. sodium hypochlorite) and/or aqueous halogen solutions (e.g. chlorine). Preferably the hypochlorite and/or the chlorine concentration in the aqueous oxidant solution range from 500 to 5000 ppm, more preferred from 1000 to 4000 ppm and most preferred from 1500 to 3000 ppm.

Oxidation as well as washing is performed in order to remove the water-soluble polymer(s) and to form the pores. Oxidation may be followed by washing or vice versa. Oxidation and washing may as well be performed simultaneously in one step. Preferably, the membrane is oxidized with an aqueous hypochloride solution or aqueous chlorine solution and subsequently washed with water and in a further step washed with aqueous sodium bisulfite solution, preferably 30 to 60 ppm aqueous sodium bisulfite solution.

Solutions according to the present invention are suitably for the manufacturing of membranes. Said Membranes obtained have high mechanical stability and have excellent separation characteristics. In particular, membranes have good molecular weight cutoffs (MWCO) in the range of 10 to 100 kDa combined with better values for the water permeance (PWP) as those mentioned in the art such as 200 to 1000 kg/h m2 bar.

Hansen solubility parameters (HSB) are established for the prediction of solubility of polymers in solvents. For individual assessment of the affinity between solvent and polymer the value of the solvent distance ($\delta_T$) is used. Compared to NMP, DMAc and DMF the higher solvent distance values of GVL for PVP, PSU, PESU and PEO do not suggest high solubility potential for these polymers in GVL.

TABLE A

Hansen solubility parameters for solvents and polymers

| | NMP | DMAc | DMF | GVL | PSU | PESU | PVP | PEO |
|---|---|---|---|---|---|---|---|---|
| $\delta_d$ [$MPa^{0.5}$] | 18.0 | 16.8 | 17.4 | 19.0 | 19.7 | 17.6 | 21.4 | 21.5 |
| $\delta_p$ [$MPa^{0.5}$] | 12.3 | 11.5 | 13.7 | 16.6 | 8.3 | 10.4 | 11.6 | 10.9 |
| $\delta_H$ [$MPa^{0.5}$] | 7.2 | 10.2 | 11.3 | 7.4 | 8.3 | 7.8 | 21.6 | 13.1 |
| $\delta_T$ PES | 2.0 | 2.8 | 4.8 | 6.4 | — | — | — | — |
| $\delta_T$ PVP | 14.7 | 12.3 | 11.2 | 15.2 | — | — | — | — |
| $\delta_T$ PSU | 4.5 | 4.7 | 6.6 | 8.4 | — | — | — | — |
| $\delta_T$ PEO | 6.8 | 5.6 | 5.3 | 8.4 | — | — | — | — |

TABLE A-continued

Hansen solubility parameters for solvents and polymers

| | NMP | DMAc | DMF | GVL | PSU | PESU | PVP | PEO |
|---|---|---|---|---|---|---|---|---|

$\delta_d$ = dispersion forces to other molecules
$\delta_p$ = dipolar intermolecular interactions
$\delta_H$ = hydrogen bonding
$\delta_T$ = solvent distance is calculated according equation:

$$\delta_T = \sqrt{(\delta_d solv - \delta_d poly)^2 + (\delta_p sol - \delta_p poly)^2 + (\delta_h sol - \delta_h poly)^2}$$

NMP, DMAc, GVL and PSU: X. Dong, H. D. Shannon and I. C. Escobar, Investigation of Polar-Clean and Gamma-Valerolactone as Solvents for Polysulfone Membrane Fabrication, *Green Polymer Chemistry: New Products, Processes, and Applications* 2018, Chapter 24, 385-403. DOI: 10.1021/bk-2018-1310.ch024.

DMF, PEO and PVP: C. M. Hansen, C. M. Hansen (Eds.), Hansen Solubility Parameters, a User's Handbook, 2nd edition, CRC Press LLC, Taylor & Francis Group, Boca Raton, FL, 2007.

PESU: Y. M. Wei, Z. L. Xu, H. L. Liu, Mathematical calculation of binodal curves of a polymer/solvent/nonsolvent system in the phase inversion process, Desalination 192 (2006), 91-104.

The membranes obtained by the process of the invention may be used for any separation purpose, for example water treatment applications, treatment of industrial and/or municipal waste-water, desalination of sea and/or brackish water, dialysis, plasmolysis and/or food processing.

FIGURES

EXAMPLES

Figure 1:
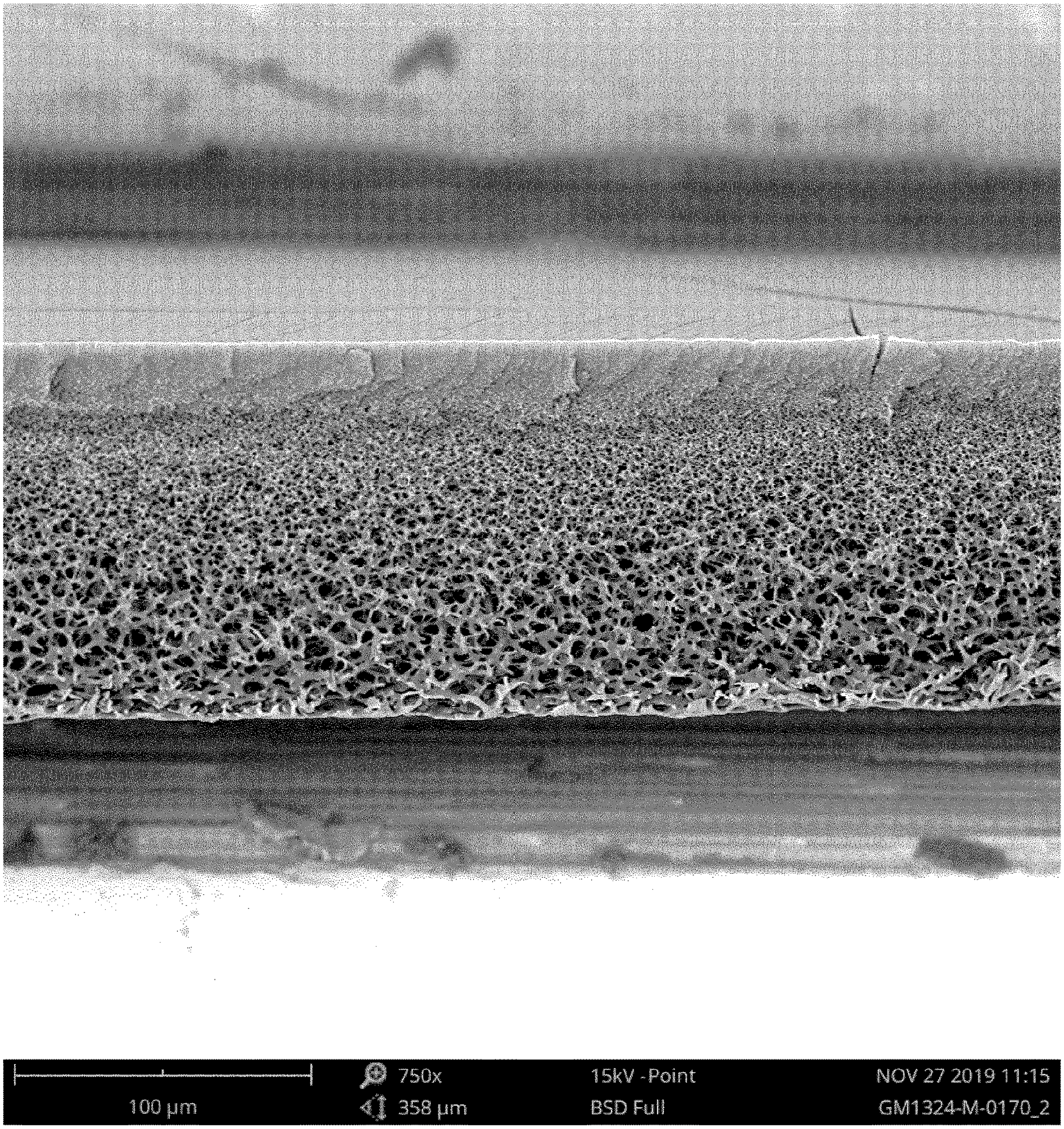
FIG. 1 shows SEM (Scanning-Electron-Microscopy) cross-section of Example 7 (750× magnification)

Abbreviations and compounds used in the examples:

PWP pure water permeance

MWCO molecular weight cutoff

GVL gamma-Valerolactone

NMP N-methylpyrrolidone

DMAc N, N-dimethylacetamide

DMF N, N-dimethylformamide

NFM N-formylmorpholine

Ultrason® E 3010 Poly(ether sulfone) with a viscosity number (ISO 307; in 0.01 g/mol phenol/1,2 orthodichlorobenzene 1:1 solution) of 66; a glass transition temperature (DSC, 10 °C/min; according to ISO 11357-1/-2) of 225 °C; a molecular weight Mw (GPC in THF, PS standard): 58000 g/mol, Mw/Mn=3.3

Ultrason® E 6020 P Poly(ether sulfone) with a viscosity number (ISO 307; in 0.01 g/mol phenol/1,2 orthodichlorobenzene 1:1 solution) of 81; a glass transition temperature (DSC, 10 °C/min; according to ISO 11357-1/-2) of 225 °C; a molecular weight Mw (GPC in THF, PS standard): 75000 g/mol, Mw/Mn=3.4

Ultrason® E 7020 P Poly(ether sulfone) with a viscosity number (ISO 307; in 0.01 g/mol phenol/1,2 orthodichlorobenzene 1:1 solution) of 100; a glass transition temperature (DSC, 10 °C/min; according to ISO 11357-1/-2) of 225 °C; a molecular weight Mw (GPC in THF, PS standard): 92000 g/mol, Mw/Mn=3.0

Ultrason® S 6010 Polysulfone with a viscosity number (ISO 307; in 0.01 g/mol phenol/1,2 orthodichlorobenzene 1:1 solution) of 81; a glass transition temperature (DSC, 10 °C/min; according to ISO 11357-1/-2) of 187 °C; a molecular weight Mw (GPC in THF, PS standard): 60000 g/mol, Mw/Mn=3.7

Luvitec® K30 Poly(N-vinyl pyrrolidone) with a solution viscosity characterised by the K-value of 30, determined according to the method of Fikentscher (Fikentscher, Cellulosechemie 13, 1932 (58))

Luvitec® K90 Poly(N-vinyl pyrrolidone) with a solution viscosity characterised by the K-value of 90, determined according to the method of Fikentscher (Fikentscher, Cellulosechemie 13, 1932 (58))

Pluriol® 400E Poly(ethylene oxide) with an average molecular weight of 400 g/mol calculated from the OH numbers according to DIN 53240.

Pluriol® 9000E Poly(ethylene oxide) with a solution viscosity characterised by the K-value of 33, determined according to the method of Fikentscher (Fikentscher, Cellulosechemie 13, 1932 (58)) and a molecular weight Mw (GPC in water with 0.01 mol phosphate buffer pH 7.4, TSKgel GMPWXL column, Tosoh Bioscience with poly (ethylene oxide) standard 106-1522000 g/mol): 10800 g/mol.

POLYOX™ WSR-N10 Poly(ethylene oxide) with a solution viscosity characterised by the K-value of 68, determined according to the method of Fikentscher (Fikentscher, Cellulosechemie 13, 1932 (58)) and a molecular weight Mw (GPC in water with 0.01 mol phosphate buffer pH 7.4, TSKgel GMPWXL column, Tosoh Bioscience with, poly (ethylene oxide) standard 106-1522000 g/mol): 102000 g/mol POLYOX™ WSR-N80 Poly(ethylene oxide) with a solution viscosity characterised by the K-value of 84, determined according to the method of Fikentscher (Fikentscher, Cellulosechemie 13, 1932 (58)) and a molecular weight Mw (GPC in water with 0.01 mol phosphate buffer pH 7.4, TSKgel GMPWXL column, Tosoh Bioscience with, poly (ethylene oxide) standard 106-1522000 g/mol): 187000 g/mol POLYOX™ WSR-N750 Poly(ethylene oxide) with a solution viscosity characterised by the K-value of 109, determined according to the method of Fikentscher (Fikentscher, Cellulosechemie 13, 1932 (58)) and a molecular weight Mw (GPC in water with 0.01 mol phosphate buffer pH 7.4, TSKgel GMPWXL column, Tosoh Bioscience with, poly(ethylene oxide) standard 106-1522000 g/mol): 456000 g/mol The pure water permeance (PWP) of the membranes was tested using a pressure cell with a diameter of 74 mm using ultrapure water (salt-free water, filtered by a Millipore UF-system) at 23 °C and 1 bar water pressure. The pure water permeation (PWP) is calculated as follows (equation 1):

$$PWP = \frac{m}{A \times P \times t} \quad (1)$$

PWP: pure water permeance [kg/bar h $m^2$]
m: mass of permeated water [kg]
A: membrane area [$m^2$]
P: pressure [bar]
t: time of the permeation experiment [h].

A high PWP allows a high flow rate and is desired.

In a subsequent test, solutions of poly(ethylene oxide)—standards with increasing molecular weight were used as feed to be filtered by the membrane at a pressure of 0.15 bar. By GPC-measurement of the feed and permeate, the molecular weight of the permeate of each poly(ethylene oxide)—standard used was determined. The weight average molecular weight (MW) cutoff of the membranes (MWCO) is the molecular weight of the first poly(ethylene oxide) standard which is withhold to at least 90% by the membrane. For example, a MWCO of 18400 means that poly(ethylene oxide) of molecular weight of 18400 and higher are withhold to at least 90%. It is desired to have a MWCO in the range from 10 to 100 kDa.

Preparation of Membranes Using GVL as Polymer Solvent (Invention) or Other Solvent (Comparative Example)

General Procedure

Into a three-neck flask equipped with a magnetic stirrer there were added 65 to 75 ml of Solvent 51, 19 g sulfone polymer (Ultrason polymer as described in the tables), 6 to 8 g water-soluble polymer (Luvitec® poly(N-vinyl pyrrolidone) or poly(alkylene oxide) as described in the tables with optional second dope additives (Pluriol® 400E) as given in tables 1-6. The mixture was heated under gentle stirring at 60 °C until a homogeneous clear viscous solution, usually referred to as dope solution was obtained. The solution was degassed overnight at room temperature.

After that the membrane solution was reheated at 60 °C for 2 hours and casted onto a glass plate with a casting knife (300 microns) at 60 °C using an Erichsen Coating machine operating at a speed of 5 mm/min. The membrane film was allowed to rest for 30 seconds before immersion in a water-based coagulation bath at 25 °C for 10 minutes (Table 7). After the membrane had detached from the glass plate, the membrane was carefully transferred into a water bath for 12 h.

Optionally afterwards the membrane was transferred into a bath containing 2000 ppm NaOCl in water at 60 °C and pH9.5 for 2 h. The membrane was then washed with water at 60 °C and one time with a 0.5 wt.-% aqueous solution of sodium bisulfite to remove active chlorine (Posttreatment A).

Or optionally the membrane was washed with water at 60 °C three times (Posttreatment B).

After several washing steps with water the membrane was stored wet until characterization regarding pure water permeability (PWP) and minimum pore size (MWCO) started.

Tables 1 to 6 summarize the membrane properties.

Membranes produced with GVL according to the invention show improved separation characteristics over membranes known from the art. Membranes produced with GVL show higher water permeability values in combination with MWCO values in the ultrafiltration range (10-100 kDa) compared to membranes known from the art.

TABLE 1

Compositions and properties of Ultrason ® E 3010 membranes prepared with Luvitec ® K90 and Pluriol ® E400; MWCO in [Da], PWP in [kg/h $m^2$bar], Posttreatment A, Coagulation W

| Examples | Water-soluble polymer Luvitec ® K90 | Sulfone polymer Ultrason ® E3010 | Additive Pluriol ® E400 | Coagulation bath Bath (cf. Table 7) | Solvent S1 | PWP | MWCO |
|---|---|---|---|---|---|---|---|
| Example 1 | 6 g | 19 g | — | W | 75 g GVL | 970 | 29300 |
| Comparative Example 2 | 6 g | 19 g | — | W | 75 g NMP | 530 | 17200 |
| Example 3 | 6 g | 19 g | 10 g | X | 65 g GVL | 990 | 28400 |
| Comparative example 4 | 6 g | 19 g | 10 g | X | 65 g NMP | 440 | 21900 |

TABLE 2

Compositions and properties of Ultrason ® E 3010 membranes prepared; MWCO in [Da], PWP in [kg/h $m^2$bar], Posttreatment A, Coagulation W

| Examples | Sulfone polymer E3010 | Water-soluble polymer Polyox | Solvent S1 | PWP | MWCO |
|---|---|---|---|---|---|
| Example 5 | 19 g | 6 g N10 | 65 g GVL | 800 | 68000 |
| Example 6 | 19 g | 3 g N750 + 3 g E9000 | 65 g GVL | 610 | 10700 |
| Example 7 | 19 g | 6 g N80 | 65 g GVL | 370 | 10800 |
| Example 8 | 19 g | 6 g N750 | 65 g GVL | 280 | 17200 |
| Comparative Example 9 | 19 g | 6 g N10 | 65 g NMP | 250 | 10000 |
| Comparative Example 10 | 19 g | 3 g N750 + 3 g E9000 | 65 g NMP | 180 | 12000 |
| Comparative Example 11 | 19 g | 6 g N80 | 65 g NMP | 280 | 10750 |
| GM Comparative Example 12 | 19 g | 6 g N750 | 65 g NMP | 260 | 9500 |

TABLE 3

Compositions and properties of Ultrason ® E 3010 membranes prepared; MWCO in [Da], PWP in [kg/h $m^2$bar], Posttreatment B, Coagulation W

| Examples | Sulfone polymer E3010 | Water-soluble polymer Polyox | Solvent S1 | PWP | MWCO |
|---|---|---|---|---|---|
| Example 13 | 19 g | 6 g N10 | 65 g GVL | 210 | 14000 |
| Example 14 | 19 g | 3 g N750 + 3 g E9000 | 65 g GVL | 220 | 10800 |

TABLE 3-continued

Compositions and properties of Ultrason ® E 3010 membranes prepared; MWCO in [Da], PWP in [kg/h $m^2$bar], Posttreatment B. Coagulation W

| Examples | Sulfone polymer E3010 | Water-soluble polymer Polyox | Solvent S1 | PWP | MWCO |
|---|---|---|---|---|---|
| Example 15 | 19 g | 6 g N80 | 65 g GVL | 250 | 15500 |
| Example 16 | 19 g | 6 g N750 | 65 g GVL | 210 | 14300 |
| Comparative Example 17 | 19 g | 6 g N10 | 65 g NMP | 76 | 50700 |
| Comparative Example 18 | 19 g | 3 g N750 + 3 g E9000 | 65 g NMP | 29 | 13200 |
| Comparative Example 19 | 19 g | 6 g N80 | 65 g NMP | 29 | 10700 |
| Comparative Example 20 | 19 g | 6 g N750 | 65 g NMP | 19 | 12900 |

TABLE 4

Compositions and properties of Ultrason ® E 6020 and Ultrason ® E 7020 membranes prepared; MWCO in [Da], PWP in [kg/h $m^2$bar], Posttreatment A. Coagulation W

| Examples | Water-soluble polymer K90 | Sulfone polymer E6020 | Sulfone polymer E7020 | Solvent S1 | PWP | MWCO |
|---|---|---|---|---|---|---|
| Example 21 | 6 g | 19 g | — | 75 g GVL | 750 | 17700 |
| Comparative Example 22 | 6 g | 19 g | — | 75 g NMP | 300 | 13300 |
| Example 23 | 6 g | — | 19 g | 75 g GVL | 470 | 23700 |
| Comparative Example 24 | 6 g | — | 19 g | 75 g NMP | 210 | 9550 |

TABLE 5

Compositions and properties of Ultrason ® S 6010 membranes prepared; MWCO in [Da], PWP in [kg/h $m^2$bar], Posttreatment A. Coagulation W

| | Water-soluble Polymer K90 | Water-soluble Polymer K30 | Sulfone Polymer S6010 | Solvent S1 | PWP | MWCO |
|---|---|---|---|---|---|---|
| Example 25 | 3 g | 3 g | 19 g | 75 g GVL | 400 | 42400 |
| Comparative Example 26 | 3 g | 3 g | 19 g | 75 g DMAc | 290 | 10900 |
| Example 27 | 6 g | — | 19 g | 75 g GVL | 410 | 69400 |
| Comparative Example 28 | 6 g | — | 19 g | 75 g DMAc | 260 | 12100 |
| Comparative Example 35 | 3 g | 3 g | 19 g | 75 g NFM | 135 | 8300 |
| Comparative Example 36 | 6 g | | 19 g | 75 g NFM | 120 | 9600 |

TABLE 6

Compositions and properties of Ultrason ® E 3010 membranes prepared; MWCO in [Da], PWP in [kg/h $m^2$bar], Posttreatment PT. Coagulation W

| | Water-soluble Polymer K90 | Sulfone polymer E3010 | PT | Solvent S1 | PWP | MWCO |
|---|---|---|---|---|---|---|
| Example 29 | 6 g | 19 g | A | 75 g GVL | 820 | 46800 |
| Comparative Example 30 | 6 g | 19 g | none | 75 g GVL | 27 | 3180 |

TABLE 6-continued

Compositions and properties of Ultrason ® E 3010 membranes prepared; MWCO in [Da], PWP in [kg/h $m^2$bar], Posttreatment PT. Coagulation W

| | Water-soluble Polymer K90 | Sulfone polymer E3010 | PT | Solvent S1 | PWP | MWCO |
|---|---|---|---|---|---|---|
| Comparative Example 31 | 6 g | 19 g | A | 75 g NMP | 570 | 21500 |
| Comparative Example 32 | 6 g | 19 g | none | 75 g NMP | 60 | 4400 |
| Example 33 | 8 g | 19 g | A | 73 g GVL | 970 | 73400 |
| Comparative Example 34 | 8 g | 19 g | A | 73 g NMP | 380 | 14700 |

TABLE 7

Compositions of the coagulation bath employed for membrane preparation

| | content | composition |
|---|---|---|
| Coagulation bath W | Water | 100 wt.-%/wt.-% |
| Coagulation bath X | Water/Pluriol ® 400E | 90/10 wt.-%/wt.-% |

Figure 2:
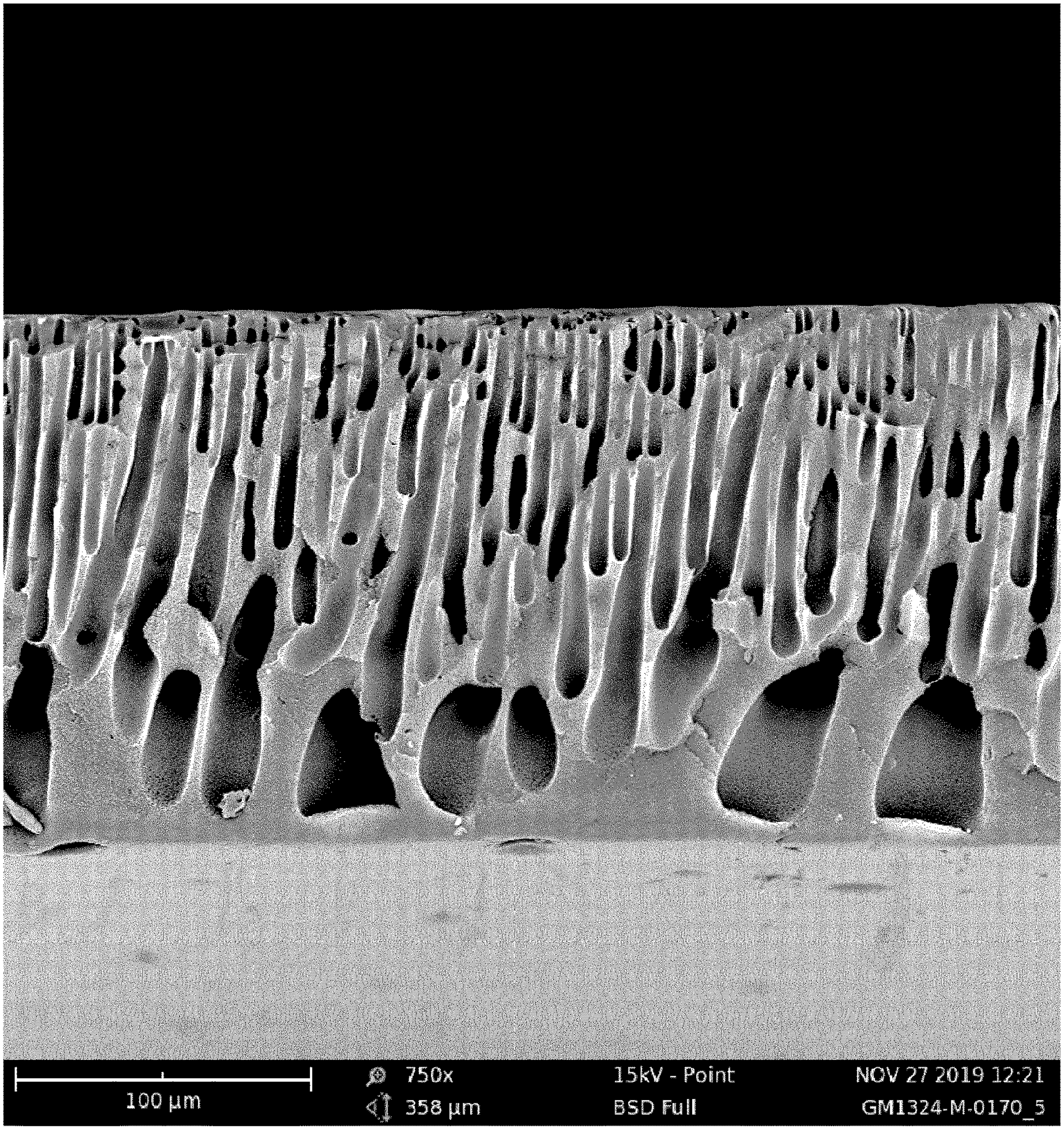
FIG. 2 shows SEM (Scanning-Electron-Microscopy) cross-section of Comparative Example 11 (750× magnification)

Membranes according to the invention are showing a well formed nano porous filtration layer on the top supported by a sponge-type substructure with increasing pore sizes from top to bottom. No defects or macrovoids are visible in the cross-section (cf. FIG. 1). Membranes from comparative examples showing numerous macrovoids which could partially penetrate the filtration layer on the top (cf. FIG. 2). Membranes produced with GVL according to the invention show improved separation characteristics over membranes known from the art. Membranes produced with GVL show higher water permeability values in combination with MWCO values in the ultrafiltration range (10-100 kDa) compared to membranes known from the art prepared with other solvents.

Turbidity Measurement:

The polymer solution turbidity was measured with a turbidimeter 2100AN (Hach Lange GmbH, Dusseldorf, Germany) employing a filter of 860 nm and expressed in nephelometric turbidity units (NTU). The turbity measurement shows solubility of a polymer in a solvent. Low NTU values are preferred.

TABLE 7

Compositions and properties of polymer solutions; turbidity@RT [NTU], Visco@60° C. [Pas],

| example | polymer | Solvent S1 | Visco | NTU (0 d) |
|---|---|---|---|---|
| Example 37 | 25 g E3010 | 75 g GVL | 2.3 | 1.3 |
| Comparative Example 38 | 25 g E3010 | 75 g NFM | * | >7500 |
| Example 39 | 25 g S6010 | 75 g GVL | 15.0 | 0.8 |
| Comparative Example 40 | 25 g S6010 | 75 g NFM | 55.0 | 3.2 |
| Comparative Example 41 | 25 g S6010 | 75 g DMF | 2.4 | 1.5 |

* no solution could be manufactured

Figure 3:
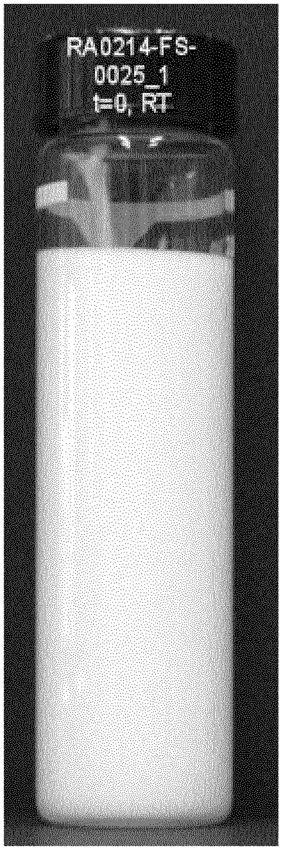
FIG. 3 shows the optical appearance of E3010 in NFM (Comparative Example 38)
Figure 4:
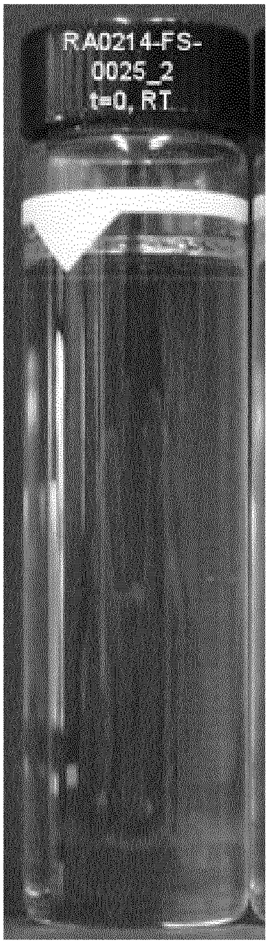
FIG. 4 shows the optical appearance of E3010 in GVL (Example 37)

Polyethersulfone (E3010) solutions produced with GVL according to the invention have low solution turbidity (FIG. 4) in contrast to NFM where only a turbid paste (no solution) could be obtained (FIG. 3). Polysulfone (E6010) solutions produced with GVL have also lower turbidity than NFM and DMF (cf. Table 7).

The invention claimed is:

1. A process for making a membrane with a solution, the solution comprising:

a) at least one sulfone polymer, b) at least one water-soluble polymer, and c) gamma-valerolactone, wherein the method comprises:

a) providing the solution, b) contacting the solution with at least one coagulant to obtain a membrane, and c) oxidizing and washing the obtained membrane.

2. The process according to claim 1, wherein said at least one sulfone polymer is a poly(ether sulfone), a polysulfone or a mixture thereof.

3. The process according to claim 1, wherein the at least one sulfone polymer comprises between 0.02 mol to 2 mol —$SO_2$— units per 100 g of the at least one sulfone polymer.

4. The process according to claim 1, wherein the at least one water-soluble polymer is selected from the group consisting of poly(N-vinyl pyrrolidone) and poly(alkylene oxides) with a molecular mass of 8000 g/mol or higher.

5. The process according to claim 1, wherein the solution further comprises an additive selected from the group consisting of $C_2$-$C_4$ alkanol, $C_2$-$C_4$ alkanediol, $C_3$-$C_4$ alkanetriol, poly(ethylene oxide) with a molar mass of 100 to 1000 g/mol, and mixtures thereof.

6. The process according to claim 1, wherein the solution comprises 5 to 50 wt.-% of the at least one sulfone polymer based on a total weight of the solution.

7. The process according to claim 1, wherein the solution comprises 0.1 to 15 wt.-% of the at least one water-soluble polymer based on a total weight of the solution.

8. The process according to claim 1, wherein the solution comprises 50 to 90 wt.-% of the gamma-valerolactone based on a total weight of the solution.

9. The process according to claim 5, wherein the solution comprises 0.1 to 25 wt.-% of the additive based on a total weight of the solution.

10. The process according to claim 1, comprising less than 2.5 wt.-% high-boiling ethers having a boiling point of more than 150 °C, esters, ketones, asymmetrically halogenated hydrocarbons, anisole, N,N-dimethylformamide, dimethyl sulfoxide, sulfolane, N-methyl-2-pyrrolidone, N-ethyl-2-pyrrolidone, N,N-dimethyl-2-hydroxypropanoic amide, N,N-diethyl-2-hydroxypropanoic amide or mixtures thereof based on a total weight of the solution.

11. The process according to claim 1, wherein the at least one coagulant comprises water, water vapor, water-alcohol-, water-poly(alkylene oxide)- and/or water-solvent mixtures, wherein the solvent is selected from the group consisting of high-boiling ethers having a boiling point of more than 150 °C, esters, ketones, asymmetrically halogenated hydrocarbons, anisole, N,N-dimethylformamide, dimethyl sulfoxide, sulfolane, N-methyl-2-pyrrolidone, N-ethyl-2-pyrrolidone, N,N-dimethyl-2-hydroxypropanoic amide, N,N-diethyl-2-hydroxypropanoic amide and mixtures thereof.

12. The process according to claim 1, wherein in step c) the membrane is oxidized with aqueous hypochlorite solution, subsequently washed with water, and in a further step washed with aqueous solution of sodium bisulfite.

13. A membrane obtained by the process according to claim 1.

14. The membrane according to claim 13, wherein an average pore size of the membrane is between 0.3 μm and 0.9 μm.

15. A method of using the membrane obtained according to claim 13, the method comprising using the membrane for ultrafiltration and/or dialysis.

16. The process according to claim 1, wherein the at least one water-soluble polymer has a molecular mass of 8000 g/mol or higher and is selected from the group consisting of poly(ethylene oxide), poly(propylene oxide), poly(ethylene oxide)/poly(propylene oxide) block copolymers, and mixtures thereof.

17. The process according to claim 1, wherein the at least one coagulant comprises a water-gamma-valerolactone mixture, wherein the solvent is selected from the group consisting of high-boiling ethers having a boiling point of more than 150 °C, esters, ketones, asymmetrically halogenated hydrocarbons, anisole, N,N-dimethylformamide, dimethyl sulfoxide, sulfolane, N-methyl-2-pyrrolidone, N-ethyl-2-pyrrolidone, N,N-dimethyl-2-hydroxypropanoic amide, N, N-diethyl-2-hydroxypropanoic amide and mixtures thereof.

* * * * *